(12) United States Patent
Viaud

(10) Patent No.: US 7,065,942 B2
(45) Date of Patent: Jun. 27, 2006

(54) ARRANGEMENT FOR WRAPPING A BALE WITH WRAPPING MATERIAL

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/794,964

(22) Filed: Mar. 5, 2004

(65) Prior Publication Data

US 2004/0250704 A1    Dec. 16, 2004

(30) Foreign Application Priority Data

Mar. 6, 2003    (DE) ................. 103 09 657

(51) Int. Cl.
*A01F 15/07*    (2006.01)
*B65B 11/00*    (2006.01)

(52) U.S. Cl. .......................... 53/587; 53/118
(58) Field of Classification Search ............. 53/64, 53/116–118, 587, 588; 56/341, 343; 100/5, 100/87–89
See application file for complete search history.

(56) References Cited

U.S. PATENT DOCUMENTS

| | | | |
|---|---|---|---|
| 4,409,784 A | | 10/1983 | VanGinhoven et al. |
| 5,129,207 A | * | 7/1992 | Butler .......................... 53/118 |
| 5,231,828 A | * | 8/1993 | Swearingen et al. .......... 56/341 |
| 5,551,218 A | * | 9/1996 | Henderson et al. ........... 53/587 |
| 5,729,953 A | | 3/1998 | Fell et al. |
| 6,050,052 A | * | 4/2000 | Herron et al. ................. 53/118 |
| 6,233,913 B1 | * | 5/2001 | Roth et al. .................... 56/341 |

FOREIGN PATENT DOCUMENTS

| | | |
|---|---|---|
| DE | 34 18 681 | 11/1985 |
| DE | 92 11 541 | 8/1992 |
| DE | 44 42 479 | 6/1995 |
| DE | 197 20 489 | 5/1997 |
| DE | 10011158 A1 | 9/2001 |
| EP | 0 296 709 | 12/1988 |
| EP | 08 15 718 | 6/1997 |

* cited by examiner

*Primary Examiner*—Stephen F. Gerrity

(57) ABSTRACT

An arrangement proposed for the wrapping of a bale with a wrapping material is provided with a drive element that is driven only briefly at the beginning of the wrapping process over a clutch arrangement and which permits the bale to carry the wrapping material along during the remainder of the wrapping process.

9 Claims, 3 Drawing Sheets

ARRANGEMENT FOR WRAPPING A BALE WITH WRAPPING MATERIAL

FIELD OF THE INVENTION

The invention concerns an arrangement for wrapping a bale with wrapping material, with a drive element, particularly a drive roll, which withdraws the wrapping material from a roll, and a baler equipped with such an arrangement.

BACKGROUND OF THE INVENTION

DE-A1-100 11 158 shows a baler with an arrangement for wrapping a bale with wrapping material. The wrapping material is withdrawn from a supply roll by means of a drive roll. The arrangement is provided with a sensor which determines whether the wrapping material is wrapped around the drive roll and is therefore not properly conducted to the bale. If the sensor detects a malfunction, then the wrapping process is stopped.

SUMMARY OF THE INVENTION

The problem underlying the invention is seen in the fact that such an arrangement for the wrapping of a bale breaks off the wrapping process only after the wrapping material has wrapped itself around the drive roll. In order to make the arrangement, or a baler equipped with such an arrangement, ready for further operation, the wrapping material must be removed from the drive roll, which is time consuming and labor intensive.

This problem is solved according to the invention by way of an arrangement that is made available for the wrapping of a bale, which prevents the wrapping material from wrapping itself around the drive roll, or generally around a drive element or jams up, if it is not wrapped properly around the bale. By the provision of a clutch arrangement it is possible to drive the drive arrangement only for a brief time interval at the beginning of the wrapping process, in order to initiate the wrapping process. After sufficient wrapping material or material has been withdrawn from the roll or the supply, in order to reach the region of the bale so as to be grasped by it, the drive of the drive element is stopped. In this way, no further material is withdrawn from the supply by the drive element. If the wrapping material has been conducted to the bale properly, it is grasped by the latter. Since the clutch permits the wrapping material to be carried along by the bale, and this process is not blocked by the drive element, the bale can be automatically wrapped with wrapping material. On the other hand, if the wrapping material is not grasped by the bale, then it is not withdrawn from the supply by the drive element.

If the clutch arrangement connects the drive element selectively with a drive shaft, then provision can be made for this drive shaft to be permanently connected with a drive which, for example, also puts the bale into rotation. The drive shaft may, for example, be connected over a belt drive with a driven roll, which also operates upon the bale.

If the clutch arrangement is provided with a free wheeling clutch, it can permit an unhampered movement of the drive element in one direction and make possible the transmission of torque in a second or opposite direction, particularly if the drive element is not driven.

The free wheeling clutch can be arranged between the drive shaft and the drive element in such a way that the drive shaft can move freely in the drive element in its normal direction of rotation when the drive element is not driven or should not be driven.

In the opposite direction, a transmission of torque is possible. This can be applied, for example, to brake the drive element that is driven by the wrapping material grasped by the bale, in that its rotational speed is limited by the free wheeling clutch to the rotational speed of the drive shaft.

Such a free wheeling clutch is particularly useful when the drive shaft is driven permanently. Here permanently is understood to mean that the drive shaft is driven at least during the wrapping process. In a usual arrangement in which the drive shaft is connected over a belt drive with a roll that put the bale into rotation, provision can also be made for the drive shaft to be driven during the entire bale formation process.

If the drive element is driven at a speed that is lower than the circumferential speed of the bale, a stretching or tensioning of the wrapping material, whose other end is grasped by the bale, can then be attained whereby it can adhere closely to the surface of the bale.

The drive of the drive elements can be performed by means that connect the drive shaft with the drive element, fixed against rotation. These means can be configured in the form of a clutch that makes possible a drive of the drive element by the drive shaft when the clutch is in activated condition or is engaged and that provides that the drive element is not driven when the clutch is disengaged.

The clutch arrangement can interact with a control or regulating arrangement that can determine in particular the position of the clutch as a function of the progress of the bale formation process or the wrapping process. Such a control or regulating arrangement is frequently provided for the monitoring and control or regulation of the bale formation process or the wrapping process, so that the additional function can be implemented in an arrangement already existing.

An arrangement for the wrapping of a bale can be applied in industry to balers that form bales of paper, garbage, textile materials, etc. However such an arrangement is particularly appropriate for an application to an agricultural baler for bales of agricultural harvested crops, since these are usually coupled to a towing vehicle and must be monitored by an operator of this towing vehicle. Malfunctions of a wrapping arrangement are difficult to detect for these operators and are frequently noticed only upon ejection of the bale.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
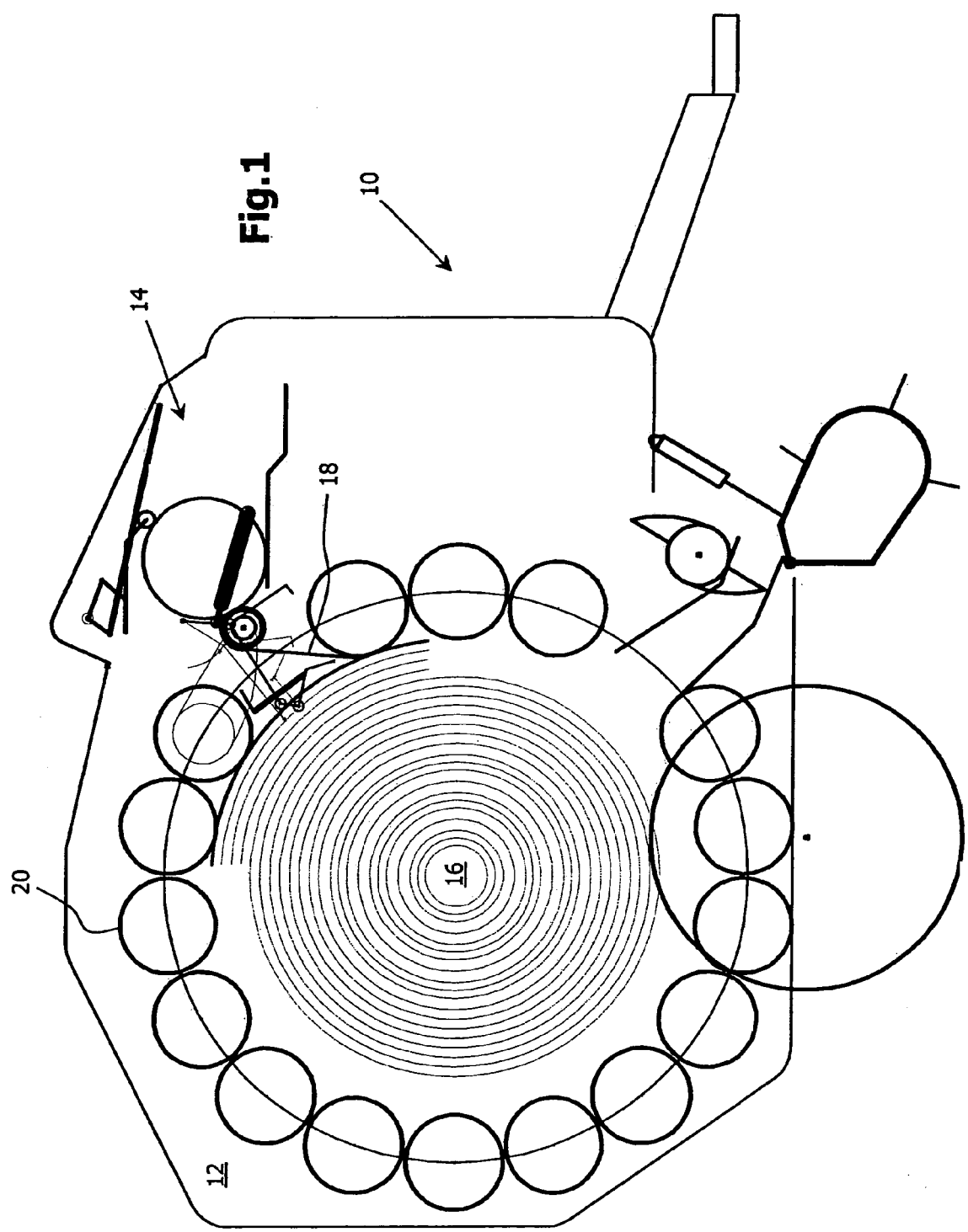
FIG. 1 is a schemtatic, right side view of a baler equipped with a bale wrapping arrangement for wrapping a bale with wrapping material.

FIG. 1 shows a baler 10 of generally conventional configuration with a baling chamber 12. According to the present embodiment, a wrapping arrangement 14 is provided for the wrapping of the bale 16 formed in the baling chamber 12 with wrapping material 18.

The baler 10 may be of a known configuration, that is, with a baling chamber 12 of constant or variable size that is surrounded entirely or in combination with belts, chains or rolls 20, as in the illustrated embodiment.

Such a baler 10 can be applied in agriculture for the formation of bales 16 of harvested crop, such as, for example, straw, hay or grass. However a use in industrial applications is also conceivable.

In the present embodiment, the wrapping device or arrangement 14 is provided on the forward side of the baler 10. The wrapping material 18 is conducted through a slot between two adjacent rolls 20 into the baling chamber 12, where it is carried along by the bale 16 which has been brought into rotation. The wrapping arrangement 14 may be arranged in a central region of the baler 10 or ahead of, or above, the baling chamber 12.

The bale 16 is wrapped by the wrapping material 18 and is thereby prevented from falling apart after leaving the baler 10. The wrapping material 18 may be foil, net, cloth, paper or the like.

Figure 2:
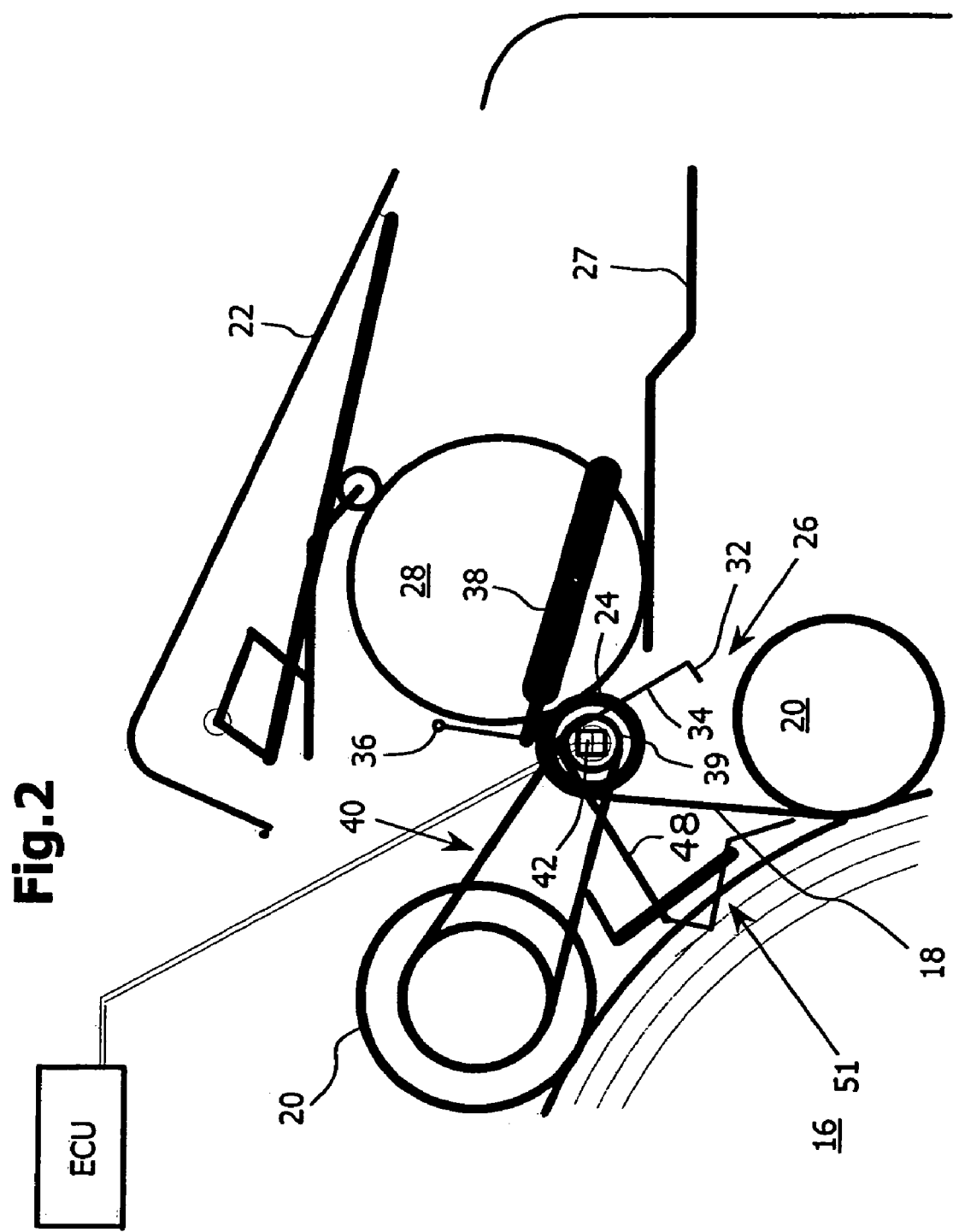
FIG. 2 is a more detailed illustration of the wrapping arrangement of FIG. 1, with a clutch arrangement for the selective drive of a drive element.

Reference will now be made to FIG. 2, in which only sections of the baler 10 are shown and the arrangement 14 is shown in an enlarged view.

The arrangement 14 is provided with a housing 22, a drive roll, designated in the following as drive element 24 and a separating arrangement 26. The housing 22 contains a floor 27 upon which the wrapping material 18 is stored as a roll 28. The floor 27 may also be configured in such a way that several rolls 28 can be stored and/or that it contains several steps or troughs in which they can be secured.

The drive element 24 is provided on its circumferential surface with a coating with a high friction coefficient and can be brought into rotation. Initially the rotation is used to withdraw the wrapping material 18 from the roll 28. The roll 28 is located above the support surface of the floor 27 and, when in its operating position, has a region that corresponds approximately to a 6 o'clock to a 9 o'clock position that is brought into contact with the drive roll 24. The wrapping material 18 is withdrawn from the roll 28 by means of the drive element 24 and is conducted through the slot between adjacent rolls 20 into the baling chamber 12. In a proper operation, the wrapping material 18 is grasped by the bale 16 and wraps the latter.

The separating arrangement 26 is provided with a knife 32 which is fastened to an arm 34 that can pivot about a bearing 36, in order to intrude into the path of the wrapping material 18 and to separate it or to bring about a tearing off when the wrapping process is completed. The knife 32 is pivoted by means of a hydraulic motor 38 that is actuated by a known electronic control or regulating unit (ECU).

Beyond that, the arm 34 is connected with a further arm 48, free to pivot, whose position is also determined by the hydraulic motor 38. In the present embodiment a guide arrangement 51 is provided, free to pivot, on the arm 38. Such a guide arrangement 51 is disclosed in U.S. patent application Ser. No. 10/462,045 filed on 13 Jun. 2003.

If the hydraulic motor 38 is in its retracted position, as shown in FIG. 2, then the knife 32 is in such a pivoted position that it does not influence the course of the wrapping material 18.

The drive element 24 can be selectively driven by a drive shaft 39 which is connected to the roll 20 over a belt drive 40, where this roll 20 can be brought into rotation by a drive, not shown.

The selective connection of the drive shaft 39 with the drive element 24 is performed over a clutch arrangement 42, that is provided between the drive shaft 39 and the drive element 24.

Figure 3:
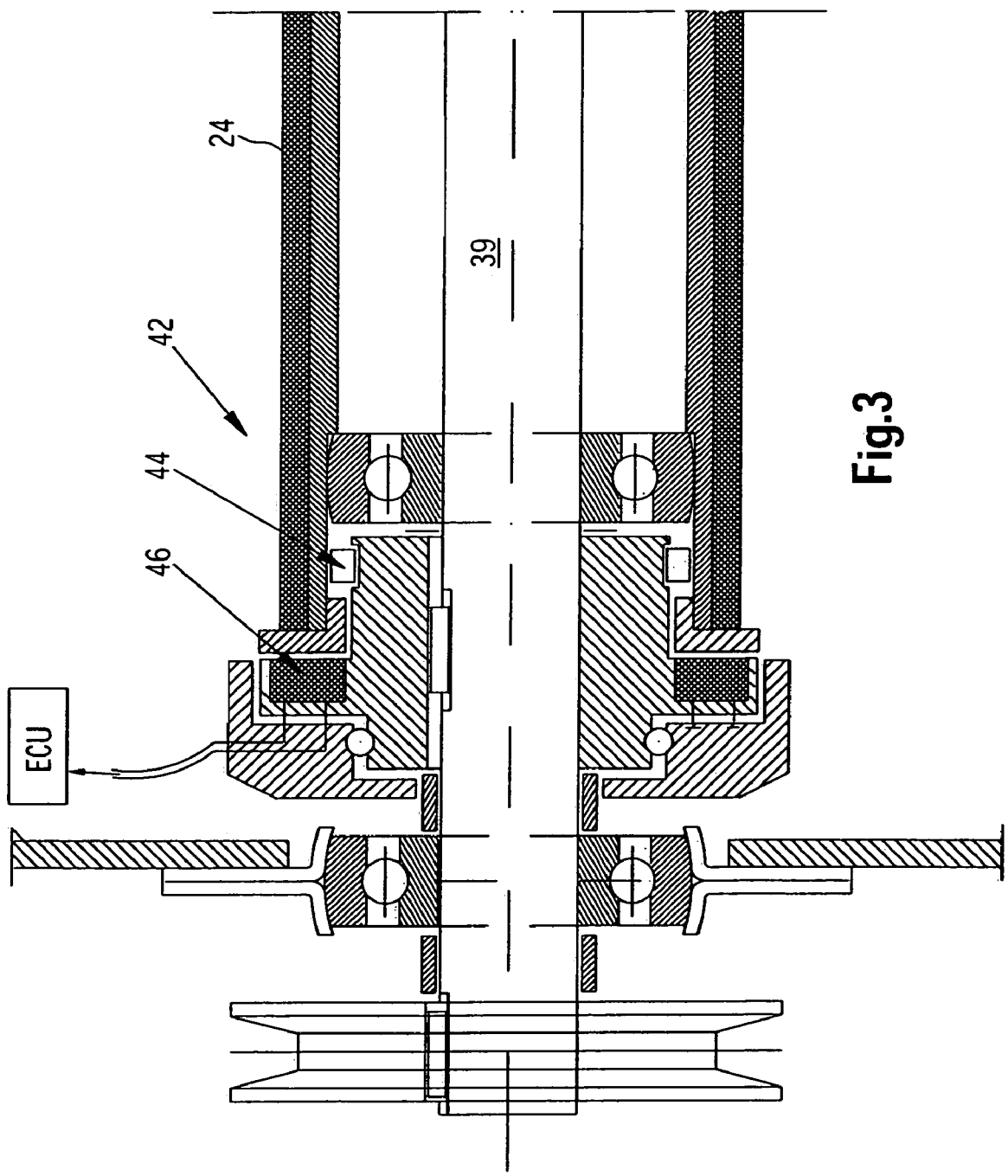
FIG. 3 is a detailed showing of the clutch arrangement of FIG. 2.

Reference will now also be made to FIG. 3, which reveals that the clutch arrangement 42 is provided with a free wheeling clutch 44, which connects the drive shaft 39 in a known manner with the drive element 24 in such a way that the drive shaft 39 can move freely in its usual drive direction in the drive element 24, in the event a torque transmission between the drive shaft 39 and the drive element 24 happens, which is opposite to the normal direction of movement of the drive shaft 39.

Beyond that, the clutch arrangement 42 is provided with a controllable clutch element 46 which can connect, fixed against rotation, the drive element 24 with the drive shaft 39 as a function of a control signal.

The following will explain in greater detail the method of operation of the arrangement 14. For this purpose reference will be made to FIGS. 1–3.

If the formation of the bale 16 in the baling chamber 12 is completed, which is determined in known manner by a sensor, not shown, which determines the girth of the bale 16, for example, mechanically or optically, then the arrangement 14 is activated. This is performed by the control or regulating unit (ECU) controlling the hydraulic motor 38 so as to bring it into the retracted position, as shown in FIG. 2.

Beyond that, the control or regulating unit (ECU) transmits a control signal to the clutch arrangement 42. On the basis of this control signal, the clutch element 46 establishes a rigid connection, fixed against rotation, between the drive shaft 39 and the drive element 24.

The drive element 24, that is now driven in rotation, withdraws the wrapping material 18 from the roll 28 and conveys it in the direction of the bale 18. Here the guide arrangement 51 supports this action, in that it guides the wrapping material 18 into contact with the bale 16.

After a short time interval, that is designed in such a way that the drive element 24 withdraws such an amount of wrapping material 18 from the roll 28 which is sufficient to reach to the bale 16 and to be grasped by the latter, then the clutch element 46 is controlled by the control and regulating arrangement (ECU) in such a way that the clutch element 46 separates the rigid connection between the drive shaft 39 and the drive element 24.

A further withdrawal of wrapping material 18 from the roll 28 is now performed by the rotating bale 16 which grasps the wrapping material 18 and carries it along on the basis of its rotation and wraps it about itself.

In the arrangement shown, the drive element 24, that is arranged so as to be free on the drive shaft 39, is brought into rotation by the wrapping material 18 that was withdrawn by the rotation of the bale 16 and will now rotate at a rotational speed that exceeds the rotational speed of the drive shaft 39. However, on the basis of the free wheeling clutch 44 the rotational speed of the drive element 24 is limited to the rotational speed of the drive shaft 39. The drive shaft 39, in turn, is connected with the driven roll 20 over the belt drive 40 in such a way that the circumferential speed of the drive element 24 is limited by the free wheeling clutch 44 to a speed that is lower than the circumferential speed of the bale 16. The wrapping material 18 is braked by the drive element 24 and is thereby stretched or tensioned. This is desirable in order to bring the wrapping material 18 into close contact with the bale 16 and enclose it tightly.

If the wrapping material 18 does not follow the predetermined path and is therefore not grasped by the bale 16, then no transport of the wrapping material 18 is performed by the bale 16. Since the drive element 24 is driven by the drive shaft 39 over the clutch element 46 only for a brief time interval at the beginning of the wrapping process, the wrapping material 18 is not withdrawn further from the roll 28 by the drive element 24 and the drive element 24 cannot be wrapped by the wrapping material 18.

Having described the preferred embodiment, it will become apparent that various modifications can be made without departing from the scope of the invention as defined in the accompanying claims.

The invention claimed is:

1. In a wrapping arrangement for wrapping a bale located in a baling chamber with a wrapping material withdrawn from a wrapping material supply roll by a drive element located for selective driven engagement with said wrapping material supply roll, the improvement comprising: a drive arrangement for said drive element including a clutch arrangement for establishing a drive connection with said drive element for a brief time interval at the beginning of the wrapping process and thereafter permits control of the speed of the drive element in order to stretch the wrapping material while it is pulled by the bale during the remainder of the wrapping process.

2. The wrapping arrangement, according to claim 1, wherein said clutch arrangement selectively connects the drive element with a drive shaft of said drive element.

3. The wrapping arrangement, according to claim 2, wherein said clutch arrangement includes a free wheeling clutch device.

4. The wrapping arrangement, according to claim 3, wherein said free wheeling clutch permits a free movement of said drive shaft in its usual direction of movement with respect to said drive element.

5. The wrapping arrangement, according to claim 4, wherein said free wheeling clutch permits a transmission of torque between said drive shaft and said drive element in a direction opposite to the usual direction of movement of the drive shaft.

6. The wrapping arrangement, according to claim 2, wherein said drive shaft is driven continuously.

7. The wrapping arrangement, according to claim 2, wherein said drive element is driven at a circumferential speed that is less than a circumferential speed of said bale.

8. The wrapping arrangement, according to claim 2, wherein said clutch arrangement is provided with means through which said drive shaft and said drive element can be connected to each other, fixed against rotation.

9. The wrapping arrangement, as defined in claim 1, wherein said wrapping arrangement includes an electronic control unit (ECU); and said clutch arrangement being coupled so as to interact with said electronic control unit (ECU).

* * * * *